Dec. 13, 1927.

C. S. HUNTINGTON 1,652,718

HOSE REEL AND CARRIER

Filed Nov. 10, 1926

Inventor:
Charles S. Huntington,
by Hazard and Miller
Attorneys

Dec. 13, 1927.
C. S. HUNTINGTON
1,652,718
HOSE REEL AND CARRIER
Filed Nov. 10, 1926  4 Sheets-Sheet 2
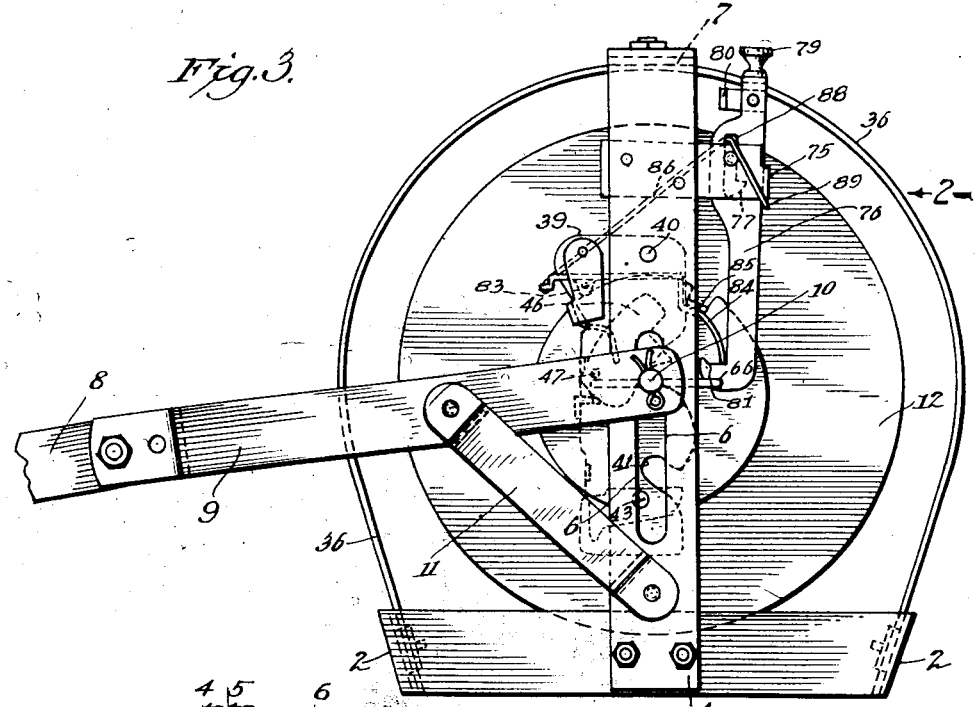
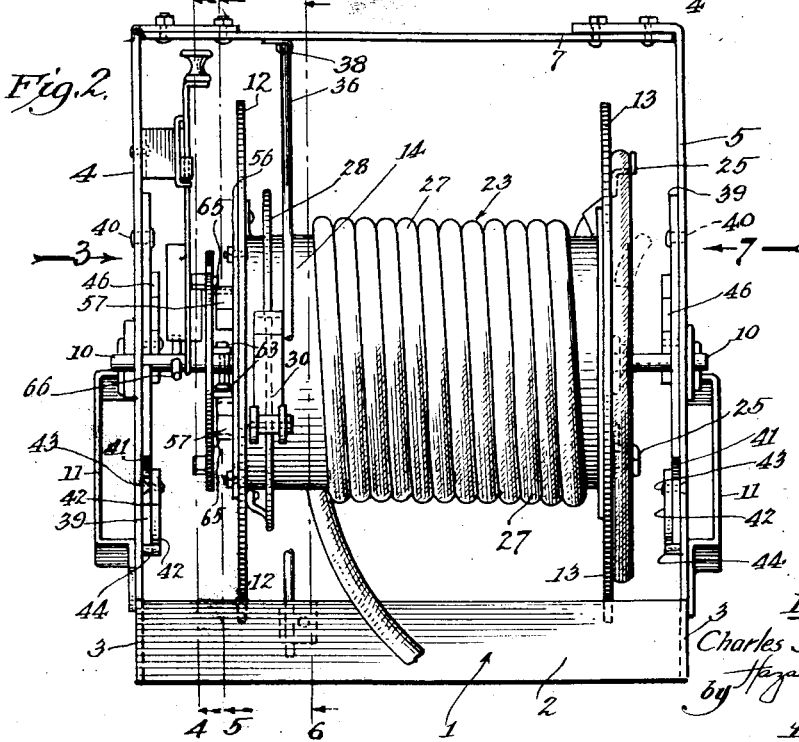
Inventor:
Charles S. Huntington,
by Hazard and Miller
Attorneys Dec. 13, 1927.

C. S. HUNTINGTON 1,652,718

HOSE REEL AND CARRIER

Filed Nov. 10, 1926

Inventor:
Charles S. Huntington,
by Hazard and Miller
Attorneys

Dec. 13, 1927.
C. S. HUNTINGTON
1,652,718
HOSE REEL AND CARRIER
Filed Nov. 10, 1926
4 Sheets-Sheet 4
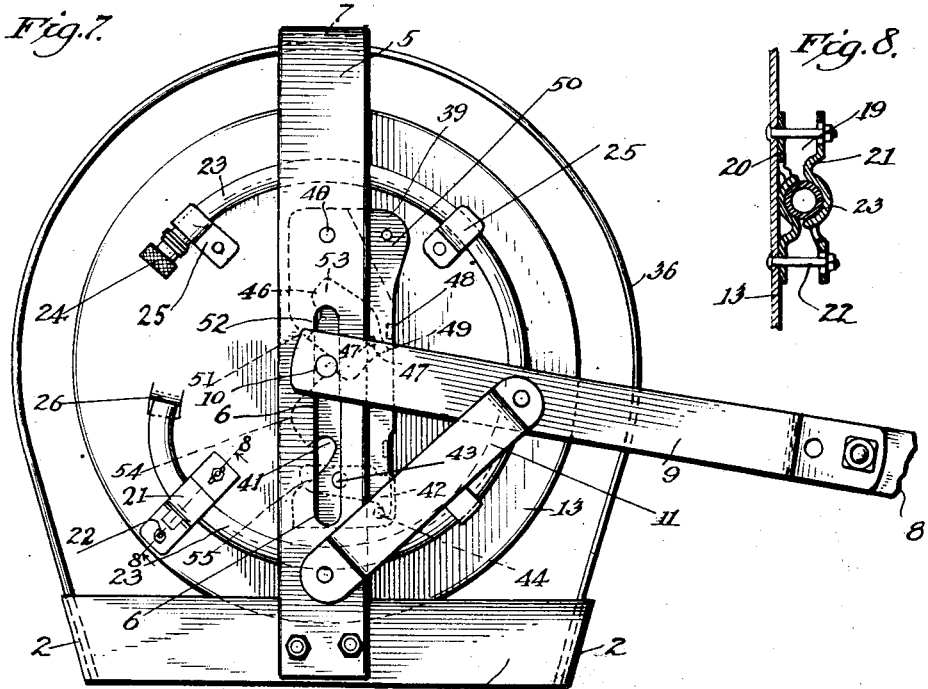
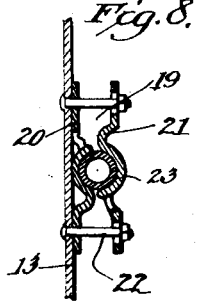
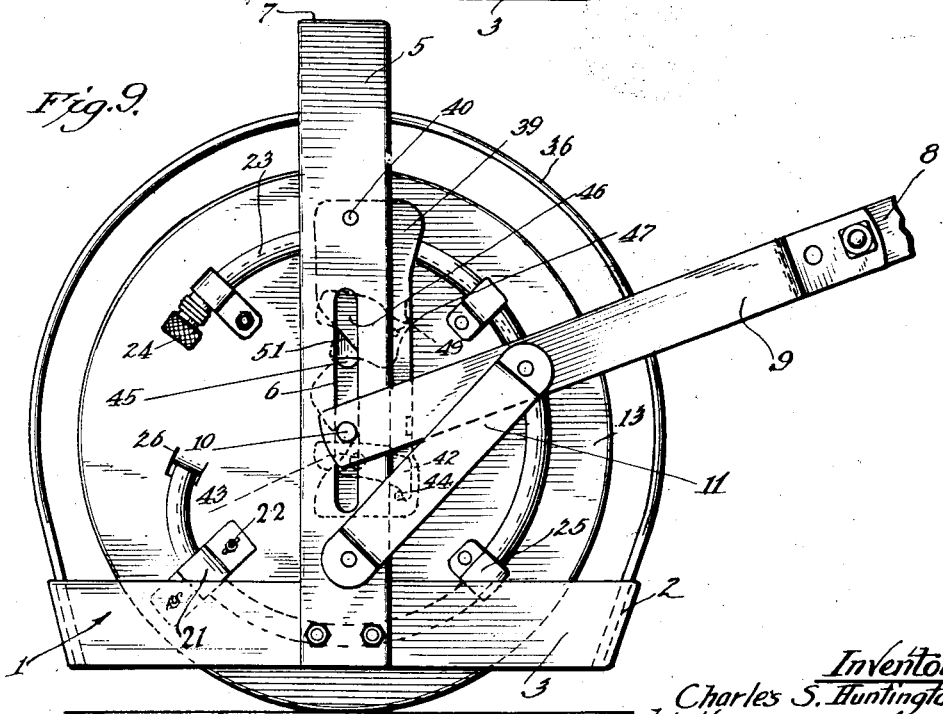
Inventor:
Charles S. Huntington,
by Hazard and Miller
Attorneys Patented Dec. 13, 1927.

1,652,718

UNITED STATES PATENT OFFICE.

CHARLES S. HUNTINGTON, OF LOS ANGELES, CALIFORNIA.

HOSE REEL AND CARRIER.

Application filed November 10, 1926. Serial No. 147,449.

My invention is a hose reel and carrier, particularly adapted for garden use, in which the hose may be coiled on the reel and wheeled to wherever it is desired to use the hose. It may then be unreeled and, when it is desired to reel in, such reeling is done by spring power.

An object of my invention is the construction of a hose reel and carrier suitable for garden purposes in which the reel has a pair of wheel-like flanges which may roll on the ground and function as wheels for utilizing the device as a carrier, that is for moving the hose from one place to another. The device is made adjustable so that the reel may be raised and lowered in reference to a rigid frame, to position the wheel-like flanges in engagement with the ground or to raise the flanges and reel above the ground to allow free rotation thereof, the device then resting on a suitable base.

Another object of my invention is to have the reel spring operated and with a latch so that on coiling the hose it may be coiled in by spring power or the latch may be set restraining the spring from operating and thus relieving the hose at any desired amount of uncoiling.

The further feature of my invention is the manner of connecting the spring between the drum and the axle and connecting the axle in the frame or running gear so that when the device is being utilized as a carrier the axle, spring and drum rotate and when it is being used as a reel, for reeling in or out the hose, the axle is held stationary and the drum rotates; in which case the spring is wound tighter as the hose is pulled out and relieves its tension as it coils in the hose.

The general characteristics of my invention comprise a suitable rigid frame having a base and supporting posts. To these an operating handle, having a yoke, is pivotally and slidably connected to the posts. The axle extends through slots in the post and is connected to the ends of the yoke, being rotatable therein. The wheel-like flanges are rotatably connected on the axle and have a reeling drum rigidly connected therewith and a coiled spring is connected between the axle and flanges. A pivotally mounted catch device connected to the posts engages the axle holding same either in a depressed position, in which the device rolls on the flanges, or in an elevated position, in which the device acts as a reel, the flanges being clear of the ground and the structure resting on the base. A suitable latching mechanism is provided by which, when the reel is raised, the axle is held stationary from rotation and the reel is spring controlled in relation to such action.

My invention will be more readily understood from the following description and drawings in which Figure 1 is a rear perspective view of my hose reel and carrier, illustrating the reel in the raised position.

Figure 2 is a front elevation as taken in the direction of the arrow 2 of Figure 3.

Figure 3 is a side elevation in the direction of the arrow 3 of Figure 2.

Figure 7 is a side elevation taken in the direction of the arrow 7 of Figure 2.

Figure 8 is a detail section of the line 8—8 of Figure 7 in the direction of the arrows, showing the means for clamping the socket end of a hose to the wheel of the reel.

Figure 9 is an elevation similar to Figure 7 with the wheels depressed and the frame elevated in the position for using the device as a hose carrier.

Figure 6:
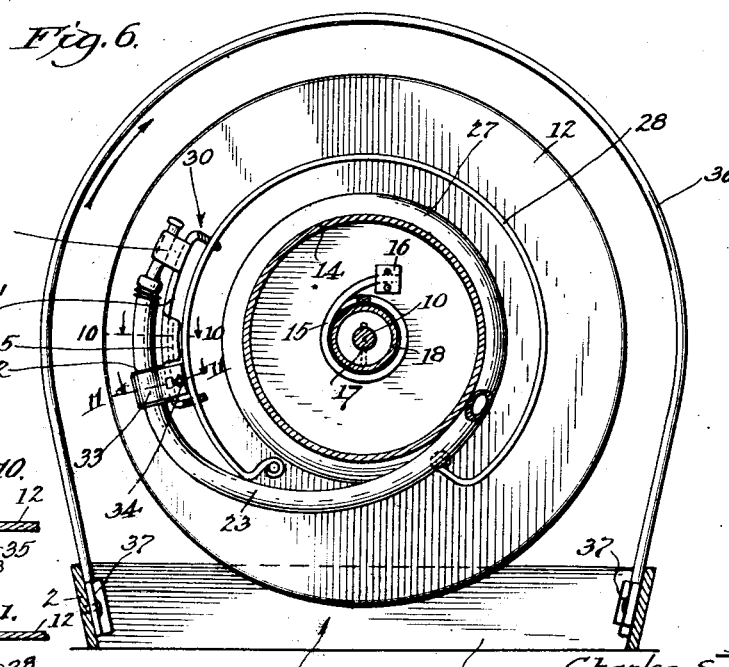
Figure 6 is a vertical longitudinal section on the line 6—6 of Figure 2 in the direction of the arrows, illustrating in particular the connection of the spring from the axle to the reel and a hose clamp attaching the nozzle end of the hose to the reel.
Figure 10:
Figure 11:
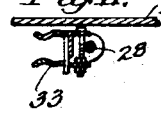

Figures 10 and 11 are detail transverse sections on the line 10—10 and 11—11 of Figure 6 in the direction of the arrows.

The framing is substantially as follows: A rectangular base which has opposite ends 2 and the sides 3, posts 4 and 5 are rigidly connected to the base and extend upward vertically therefrom. Each of the posts has an elongated slot 6, a horizontal cross bar 7 connects the posts at the top, a handle 8 is rigidly connected to a yoke 9, this yoke having a pivotal connection with the axle 10, this axle extending from side to side of the device and operating vertically in the slot 6. Links 11 on opposite sides of the device are pivotally connected between the posts and the arms of the yoke 9. These function as levers for raising and lowering the axle by operating the handle.

The construction of the reel and hose carrier is substantially as follows: A pair of wheels 12 and 13 are journaled on the axle to have free rotation thereon and the reeling drum 14 is rigidly connected between these wheels. This forms substantially an open structure with a cylindrical drum and flange-like wheels, journaled for rotation on the axle 10. A coiled spring 15 has one end 16 connected to one of the wheels and hence operating the drum and the other end 17 connected to the axle, there being a loose cylinder 18 inside the spring around which the spring may be coiled.

The arrangement for attaching the hose is substantially as follows: Having reference particularly to Figures 1, 2, 6, 7 and 8, a hose clamp 19 is secured on the outside of the wheel 13, and comprises a base 20 rigidly or otherwise secured to the wheel and a removable bar 21 secured to the base 20 or the wheel by bolts 22. The clamp is shaped to fit the hose 23 and the socket end 24 is intended to be thus clamped to one of the wheels. Brackets 25 on the outside of the wheel form a support for the hose, this passing through an opening 26 to the inside of the wheel and having coils 27 on the drum 14.

The nozzle end of the hose is secured in a fixed position by having arcuate rod 28 rigidly connecting its ends to the inside of the opposite wheel, this being the wheel 12, as illustrated. A sliding nozzle support 30 is formed of a strap 30', having perforations in its opposite ends so that it may slide on the arcuate bar 28 and has a clip 31 engaging the nozzle and a clamping clip 32, having two opposite blades, one of which 33 is slidably connected to the strap 30' and clamped by a bolt 34, thus securely holding the end of the hose adjacent the nozzle, the arcuate bar 28 allowing for a considerable adjustment, the hose being kept in a sufficiently tight coil on the drum by the spring tab 35 (Figs. 10 and 11). A guide rod 36 extends completely over the drum, being attached at its ends 37, to the end walls of the base and at the top 38 to the cross bar 7. This guides the hose when being reeled in and out.

The construction of the catch device for holding the axle in the high or low position is substantially as follows: Having reference particularly to Figures 1, 3, 4, 7 and 9; an arm 39 is connected by a pivot pin 40 at its upper end to each of the posts 4 and 5, these arms 39 being substantially the same in shape, and each having a lower notch 41 which is inclined upwardly and a pivotally mounted dog 42 having a pivot pin 43 and engaging a stop pin 44. This dog holds the axle 10 in the notch 41 when the handle is raised and the yoke tilted down, shown in Figure 9. An upper notch 45 has an entrance thereto inclined downwardly and a pivoted dog 46 mounted on a pin 47 engages the axle 10 when in the upper position, as shown in Figure 7, and holds same from displacement. A suitable lug 48 on the back of the arm 39 engages a projection 49 on the dog and limits its downward movement. A counter-weight 50 is secured to the upper part of each of the arms 39 so that the natural hang of same will be downwardly and in alignment with the posts 4 and 5.

The manner of catching the axle in the notches 41 or 45 is substantially as follows: Presuming the device is in the position shown in Figure 7 with the wheels lifted from the ground as used for reeling the hose in and out and that it is desired to shift same to the position shown in Figure 9, the handle is depressed and such action causes the axle to bear against the inclined surface 51 leading into the notch 45 from the top, such action pivots the arms 39 rearwardly and as the axle passes the edge 52 of the dog 46, such dog drops downwardly into the position shown in Figure 9, the axle fitting under the projection 53 of the dog, thus on raising the handle the axle is prevented from entering into the notch 45. On the downward movement of the axle it rides over the projection 54 on the edge of each of the arms 39 and depresses the dog 42, which naturally occupies the position as shown in Figure 7, the axle thus engages the inclined surface 55 of the lower notch 41 and on a slight downward pressure of the handle the axle is swung into the notch 41 as the arms 39 are counter-weighted to hang in alignment with the posts 4 and 5.

When the reverse operation is desired, that is to shift the device from the position of Figure 9 to that of Figure 7, the handle is slightly raised so that the axle, being forced downwardly and bearing on the inclined edge 55 of the notch 41, forces the arm 39 backwardly and after a sufficient degree of motion the dog 42 drops into the position as shown in Figure 7 and prevents the axle on its upward motion passing into the notch 41. At times it may be necessary to slightly incline the base in order to throw the posts slightly out of vertical line rearwardly in order that the arms 39 will hang slightly to the rear. On the continued lowering of the handle the axle is raised and shoves the upper dog 46 upwardly, the axle sliding into the upper notch 45.

Figure 1:
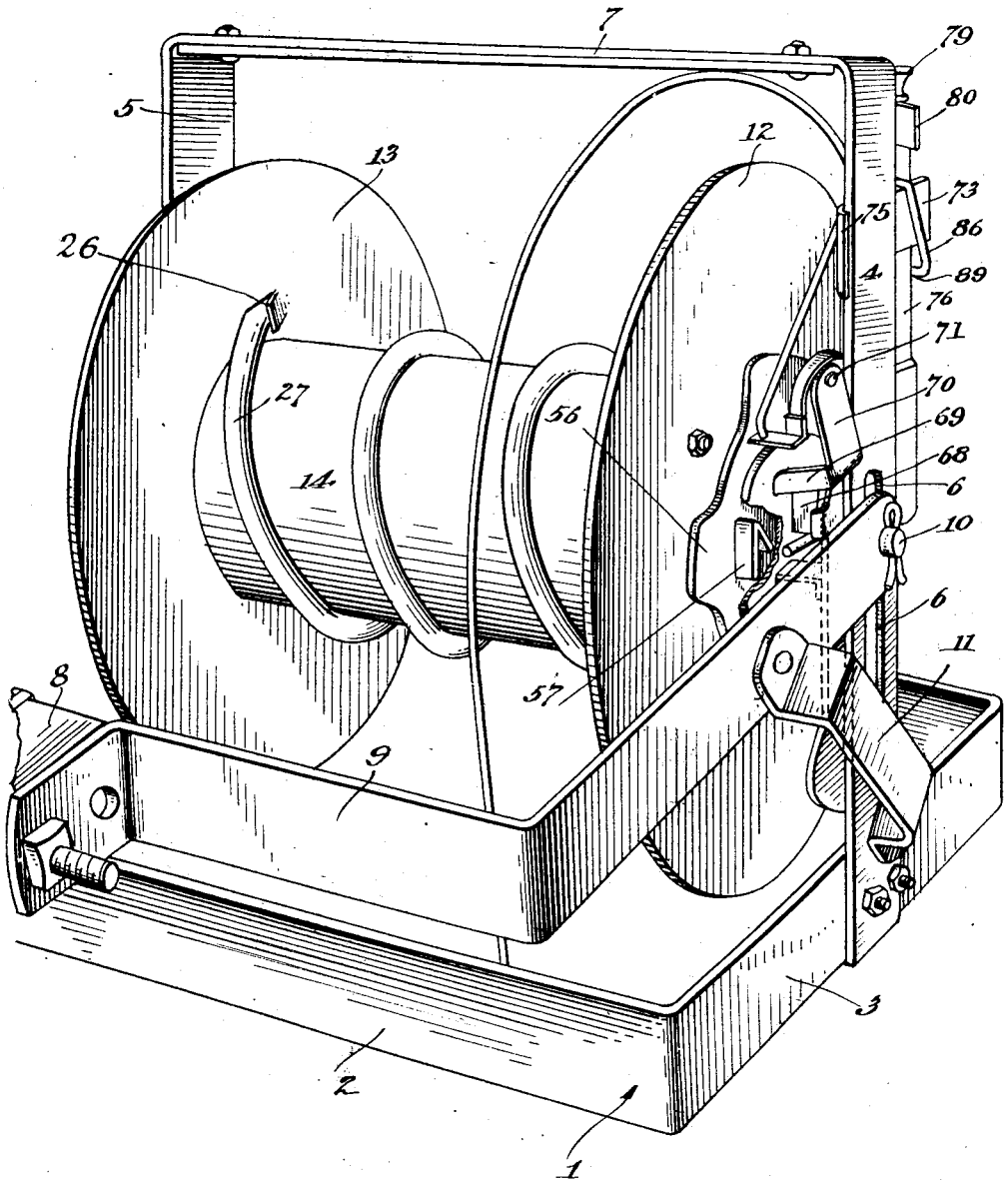
Figure 5:
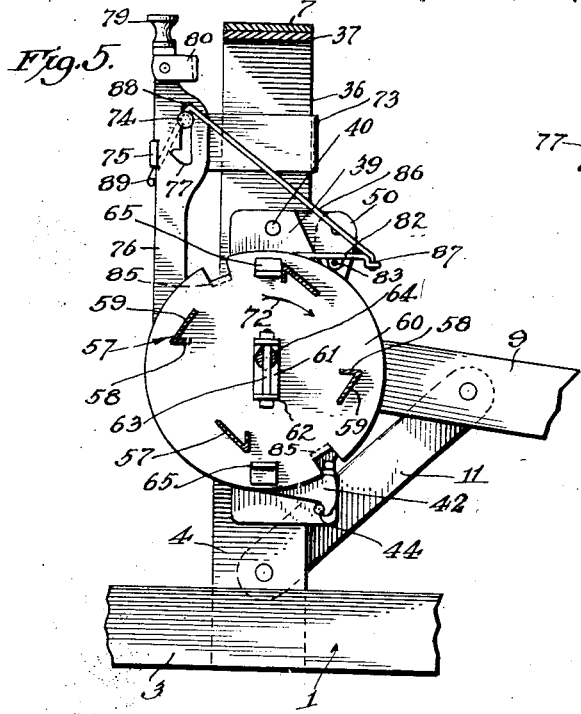
Figure 5 is a vertical longitudinal section on the line 5—5 of Figure 2 in the direction of the arrows.

The arrangement for holding the axle stationary or allowing same to rotate is substantially as follows: A cam supporting plate 56 is rigidly secured to one of the wheels and illustrated as being attached to wheel 12 and has outwardly projecting cams 57 arranged in a circle concentric to the axle 10, The cams 57 have a substantially radial abutment surface 58 and an inclined surface 59 and shiftable disc 60 has a slot 61 therein and a pair of lugs 62 at opposite ends of said slot and a slide pin 63 connected between the lugs and slidable through an aperture 64 in the axle 10. In this manner the disc 60 can shift in a diametrical direction on the axle 10. A pair of stop lugs 65 are secured to the disc 60 and when the slot occupies a vertical position and the disc is in its lowermost position the stop lug 65 which happens to be uppermost engages the abutment surface 58 of the cams which are secured to the rotatable wheels. It will be noted that the lower stop lug 65 clears the cams, as illustrated in Figure 5. The axle 10 carries a cross pin 66 which is substantially at right angles to the slide pin 63. This pin is outside of the disc 60 and adjacent to one of the arms 39, as illustrated, this being the arm pivot on the post 4. The projecting ends of the pin on opposite sides of the axle are sufficiently long to engage a stop bracket 67 secured to the back of the arm 39, above mentioned, and projecting inwardly, the upper surface being substantially horizontal. A finger 68 extends over the back, as indicated by the numeral 69, of the arm 39, above mentioned, and is attached to a plate 70 which by a pivot pin 71 is pivotally connected to the upper end of the arm 39, adjacent the post 4. In this manner the pin 66 is caught between the stop bracket 67 and the finger 68 when the reel is in its uppermost position, as shown in Figure 4.

From the above construction it will be seen that when the axle is held stationary by the pin 66, being retained between the stop 67 and the finger 68, that the drum cannot rotate in an anti-clockwise direction, in relation to Figure 5, but may rotate in a clockwise direction as indicated by the arrow 72, in which case the stop lugs ride on the inclined cam surface 59 of the cams 57, which cams, as above mentioned, are rigidly connected to the wheel 12. This allows the hose to be unrolled but prevents the spring from coiling same in, thus the hose may be drawn out to the desired distance and is retained in the manner so drawn out.

The manner of unlatching the device so that the hose may be coiled in is substantially as follows: Having reference particularly to Figures 1, 2, 3, 4 and 5, a bracket 73 is rigidly connected to the post 4 and projects forwardly of such posts having a pin 74 rigidly connected to the bracket and the bracket has the guide flange 75 to engage the back of the latch bar 76. This latch bar has a vertical slot 77 with a notch 78 adjacent its lower part. The latch bar has an operating handle 79 at the top and a stop flange 80 to engage with the front of the post 4. The lower end of the latch bar 76 has a hook 81 for a purpose hereunder set forth. An arm 82 is connected by a pivot pin 83 to the arm 39 on the side of the device adjacent to post 4 and when the reel is in the upper position the arm extends substantially horizontally and has an arcuate section 84, the end of such section engaging with the hook 81. A pair of flange strips 85 extend outwardly from the disc 60 at diametrically opposite points and engage on the outside of the arcuate section 84 of the arm 82, as shown in Fig. 4. A wire or rod 86 is secured at 87 to the rear end of the arm 82 and extends loosely through the upper end 88 of the slot 77 and has a guide end 89 fitting over the back of the latch bar 76, as illustrated in Figs. 3, 4 and 5.

Figure 4:
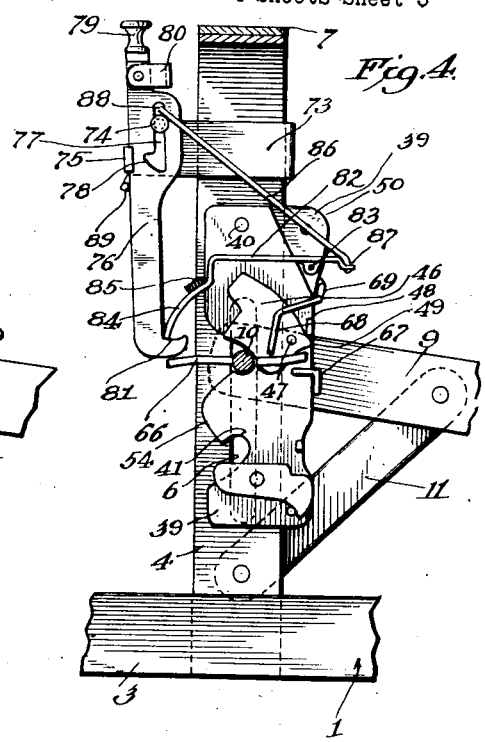
Figure 4 is a vertical longitudinal section on the line 4—4 of Figure 2 in the direction of the arrows.

The manner of functioning of the latch bar 76 and its associated mechanism is substantially as follows: presuming the device is in a position as illustrated in Figures 4 and 5, in which case the axle is locked from movement and the reel may only operate to allow unreeling of the hose but prevents coiling same in. When the latch bar is lifted upwardly by the handle 79, the pin 74 may be engaged in the notch 78 at the bottom of the slot 77 and holds such latch bar elevated. The hook 81 lifts the arcuate end 84 of the arm 82 and in so doing, by its engagement with the flange strips 85, lifts the disc 60 upwardly. This upward motion is controlled so that the upper stop lug 65 on the disc 60 is elevated above the cams 57 rigidly connected to the wheel 12 but so that the lowermost stop lug 65 does not engage with said cams, hence as the axle is still held stationary and the wheels and drum may rotate in either direction in relation to the axle, the spring 15 rotates the drum, such spring being initially under slight tension which is increased by unreeling the hose thus causing the hose to be reeled inwardly onto the drum. The hose may be reeled in any desired extent and the latch bar dropped holding same in such reeled in position or it may be completely reeled in and the nozzle end caught in the holding device illustrated particularly in Fig. 6.

When the reel is in the upper position and unlatched so that the spring may wind it in, that is with the latching bar 76 in its upper position, this bar may be released by manipulation of the handle instead of by utilizing the hand grip 79, as above mentioned. In this case the handle of the device is slightly depressed and in so doing the arm 39 is swung rearwardly. This action forces the end 88 of the rod 86 forwardly, the weight of the arm 82 and the arcuate part 84 having a downward tilt on the pivot pin 83. This thrust of the rod 86 is sufficient to trip the latch bar 76 so that the notch 78 is freed from the pin 74, the bar then dropping to its lower position and thus preventing reeling in of the hose.

Presuming the reel is to be dropped so that it may be utilized as a carrier, the action is substantially as follows: The specification above has detailed the function of the arms 39 in allowing the axle to drop from its upper to its lower position, hence this need not be further described except to mention that the latch bar 76 may be tripped, as above mentioned, in the one operation of lowering the reel by actuating the handle. When the reel is in the lower position of Fig. 9, the axle drops, hence the pin 66 is brought out of engagement of the stop bracket 67 and the finger 68, hence the axle is free to rotate. This, however, rotates substantially with the drum as the disc 60 is free to slide so that when the axle turns it drops to the limit allowed by the slot 61. In such position the stop lug 65, in an uppermost position on the disc, engages one or the other of the cams 57 on the wheel and hence causes the rotation of the axle and the wheel with its rigidly secured reel substantially the same amount in either direction. This action prevents the spring from being uncoiled too much should there be a frictional resistance to the rotation of the axle, or prevents it being coiled too tight should there also be such frictional resistance, hence the spring of the device, when utilized as a carrier, is left substantially at the tension which it had when the hose was reeled in.

It is manifest that when the device is used as a carrier the hose should be securely fastened in the nozzle gripping device, illustrated particularly in Fig. 6, and it is to be noted that this device having the sliding nozzle support 30 may be pivoted on the arcuate rod 28, being turned in the position at right angles to that illustrated in Fig. 6. This turning frees the spring tab 35 from the arcuate rod and when it is swung backwardly in the position shown in Fig. 6 this spring tab again tightly engages the arcuate rod 28 and restrains the nozzle from slipping around the drum.

From the above description, in connection with the drawings, it will be seen that I have developed a combined hose reel and carrier in which the hose may have the socket end securely fastened to one of the wheels on the outside thereof with sufficient free hose to allow connection to a water faucet and that the device may be raised into the position for unreeling a sufficient amount of hose without unreeling the whole of the hose; then by manipulation of the latch bar 76 the hose may be reeled in to any desired extent. The device also functions readily as a carrier for transporting the hose from place to place by reeling it in and securing the socket end to the outside of one of the wheels and the nozzle end to the inside of the other wheel, thence on lowering the drum until the wheels are in contact with the ground it may be used for transporting the hose.

Various changes may be made in the principles of my invention without departing from the spirit thereof, as set forth in the description, drawings, and claims.

I claim:

1. A hose reel and carrier comprising in combination, a drum having wheels connected thereto, a stand, an axle for the drum and wheels, means to secure the axle in a plurality of positions on the stand with the wheels engaged with the ground or raised above the ground, and means to secure a hose on the drum.

2. A hose reel and carrier comprising in combination, a stand having a handle provided with a yoke, the handle having a pivotal and slidable connection with the stand, an axle, wheels and a drum journaled on the axle, and a catch device to secure the axle at a plurality of positions relative to the stand with the wheels on the ground and elevated above the ground, said catch device being actuated by the movement of the handle.

3. A hose reel and carrier comprising in combination, a stand having a base and a pair of posts, a handle having a yoke with slidable and pivotal connection with the posts, an axle journaled in the yoke, a drum having wheels rotatably mounted on the axle, a spring means interconnected between the axle and the drum to rotate the drum, and a catch device connected with the posts to secure the axle at a plurality of positions relative to the posts.

4. As claimed in claim 3: the catch device having an arm pivotally connected to each post, each arm having a pair of notches at different elevations and means to secure the axle in lower or upper notches.

5. A hose reel and carrier comprising in combination, a stand comprising a base with posts extending vertically upward therefrom, said posts each having a vertical slot, a handle having a yoke, with links pivotally connected to the yoke and the posts, an axle journaled in the yoke and slidably mounted in the vertical slots, a drum having wheels rotatably mounted on the axle; an arm pivotally mounted on each post, each arm having a lower and an upper notch with pivotally mounted dogs adjacent said notches to hold the axle in an upper pair or a lower pair of notches in accordance with the position of the handle.

6. As claimed in claim 5: a winding spring inter-connected between the axle and the drum and means to hold the axle stationary to allow rotation of the drum on the axle when in an elevated position.

7. As claimed in claim 5: a cross pin connected to the axle, a stop bracket on one of the pivoted arms, a finger pivotally connected to the same arm, said bracket and finger engaging the cross pin to hold the axle stationary.

8. A hose reel and carrier comprising in combination, a stand having vertical posts, an axle slidably mounted in relation to said posts, means to support the axle at a plurality of different elevations, a drum rotatably mounted on the axle, means to hold the axle from rotation in an upper position, and means to allow rotation of the drum in one direction but prevent rotation of the drum in the opposite direction.

9. As claimed in claim 8: the means to prevent rotation of the drum comprising a plurality of cams, means connecting said cams to the drum, a structure slidable transversely of the axle and stop lugs on said structure to engage the said cams.

10. A hose reel and carrier comprising in combination, a stand having a pair of vertical posts, an axle, a handle, means connecting the axle and handle to elevate or raise the said axle by movement of the handle, a catch means connected to the posts to secure the axle in an upper or a lower position, a drum having wheels rotatable on the axle, means to retain the axle from rotation, a plurality of cams connected to one of the wheels, a disc slidable transversely of the axle, and a plurality of stop lugs connecting said disc to engage the cams and allow rotation of the drum in one direction but prevent rotation of the drum in the opposite direction.

11. As claimed in claim 10: the disc having a plurality of flange strips, a pivoted arm having an arcuate end, such end engaging the flange strips, and a latch means to raise and lower the said strips, and hence the disc, to disengage the stop lugs from the cams.

12. A hose reel and carrier comprising in combination, a stand having a pair of posts with vertical slots, a handle having a yoke, an axle journaled in the yoke to slide in the said slots, pivotally mounted arms on the posts having upper and lower notches to engage the axle and secure same in a lower and upper position, means to prevent rotation of the axle when in an upper position, a drum having wheels rotatable on the axle, winding spring means inter-connecting the drum and the axle, and stop means inter-connected between the axle and one of the wheels to prevent rotation of the drum in one direction but to allow rotation in the other direction, and a latching device to release the said stop means.

13. As claimed in claim 12: the latching device having a vertically slidable latch bar with a hook having a slot with a notch, a fixed pin in the slot to engage in the notch and hold the latch bar in an elevated position, an arm pivotally mounted on one of the arms supporting the axle, said pivoted arm engaging the said hook, and connecting means between the pivoted arm and the stop means to shift said stop means to allow rotation of the drum in either direction.

14. A hose reel and carrier comprising in combination, a stand having a pair of vertical posts, an axle slidably mounted in relation to the posts, means to retain the axle in an upper or a lower position, means to prevent rotation of the axle, a drum having wheels rotatably mounted on the axle, a plurality of cams rigidly connected to one of the wheels, a disc slidable transversely of the axle having stop lugs to engage the said cams when the axle is in an upper position, a slidably mounted latch bar having a hook, a fixed structure supporting said latch bar, a pivotally mounted arm having an arcuate end, a plurality of flange strips engaging over said arcuate end, said strips being connected to the disc, means to tilt the arm having the arcuate end to release the flange strip, such end engaging with the hook of the latch bar, a means to support the latch bar in a raised position, said hook lifting the said arcuate end, the flange strip, and hence the disc, and moving the stop lugs out of engagement with the said cams.

15. As claimed in claim 14: the arm having the arcuate end being connected to an arm pivotally mounted on one of the posts, said latter arm being swung by the raising and lowering of the axle, and a rod interconnecting the arm having the arcuate end and the latch bar to lower said bar from its upper to its lower position and allow dropping of the axle from an upper to a lower position.

16. In a hose reel and carrier a stand, a drum having wheels, means to raise and lower the drum in reference to the stand and secure same in a plurality of positions with the wheels in engagement with the ground or above the ground, a hose clamp secured to the outside of one of the wheels, there being an opening in the wheels for the passage of the hose, the drum forming the means to coil the hose, and means to secure the nozzle end of the hose in a plurality of different positions relative to the circumference of the drum.

17. As claimed in claim 16: the means to secure the nozzle end of the hose comprising an arcuate rod secured to one of the wheels, a sliding nozzle support rotatably mounted on said rod, and means to clamp the nozzle and the hose adjacent said nozzle to said support.

18. In a hose reel and carrier a rotatably mounted drum having a wheel-like flange extending outwardly therefrom, an arcuate arm connected to the flange and spaced from the drum, a hose carrier slidably and pivotally mounted on the said arm, and means to clamp one end of the hose to said carrier, the carrier having friction means engaging the said rod when the carrier is positioned radially outwardly in relation to the drum and to disengage said rod when the carrier is positioned substantially parallel to the drum.

19. In a hose reel and carrier a support having a pair of posts, an axle slidably mounted in relation to said posts and having means to support same at a plurality of elevations, a drum having wheels rotatably mounted on the axle, means to hold the axle stationary and allow rotation of the drum in one direction when elevated, and means to substantially rotate the drum and axle together when in a lowered position with the wheels in engagement with the ground.

20. As claimed in claim 19: having means to allow rotation of the drum in the opposite direction when the axle is in an upper position, and a winding spring inter-connecting the axle and the drum to cause such rotation.

21. A hose reel and carrier, as claimed in claim 3, the catch device having an arm pivotally connected to each post, each arm having a pair of notches at different elevations, and means to secure the axle in lower or upper notches, the means to secure the axle in the notches comprising dogs pivotally connected to the pivoted arms.

22. A hose reel and carrier, as claimed in claim 8, the means to prevent rotation of the drum comprising a plurality of cams, means connecting said cams to the drum, a structure slidable transversely of the axle and stop lugs on said structure to engage the said cams, having a latch means to disengage the structure having the stop lugs from the cams, said latch means positioning the stop lugs to clear the cams in rotation of the drum.

23. A hose reel and carrier, as claimed in claim 10, the disc having a plurality of flange strips, a pivoted arm having an arcuate end, such end engaging the flange strips, and a latch means to raise and lower the said strips and hence the disc to disengage the stop lugs from the cams, the latch means comprising a vertically slidable latch bar having a slot, a fixed bar operative in said slot, there being a notch in the bar to engage the pin and hold the latch bar in an upper position, said latch bar having a hook engaging the arm having the arcuate end.

24. In a hose reel and carrier, as claimed in claim 16, the means to secure the nozzle end of the hose comprising an arcuate rod secured to one of the wheels, a sliding nozzle support rotatably mounted on said rod, and means to clamp the nozzle and the hose adjacent said nozzle to said support, the support having a friction device engaging the arcuate rod when located in a radial position from the drum, said friction means disengaging the arcuate rod when the support is turned substantially parallel to the drum.

In testimony whereof I have signed my name to this specification.

CHARLES S. HUNTINGTON.